United States Patent [19]
Nakacho et al.

[11] Patent Number: 5,376,478
[45] Date of Patent: * Dec. 27, 1994

[54] LITHIUM SECONDARY BATTERY OF VANADIUM PENTOXIDE AND POLYPHOSPHAZENE

[75] Inventors: Yoshifumi Nakacho; Akiyoshi Inubushi; Yuji Tada; Shuji Masuda; Masatoshi Taniguchi, all of Tokushima, Japan

[73] Assignee: Otsuka Kagaku Kabushiki Kaisha, Osaka, Japan

[*] Notice: The portion of the term of this patent subsequent to Jun. 20, 2006 has been disclaimed.

[21] Appl. No.: 952,138
[22] PCT Filed: Feb. 21, 1990
[86] PCT No.: PCT/JP90/00209
 § 371 Date: Oct. 19, 1990
 § 102(e) Date: Oct. 19, 1990
[87] PCT Pub. No.: WO90/10316
 PCT Pub. Date: Jul. 9, 1990

Related U.S. Application Data

[63] Continuation of Ser. No. 598,641, Oct. 19, 1990, abandoned.

[30] Foreign Application Priority Data

Feb. 22, 1989 [JP] Japan ................................. 1-44329

[51] Int. Cl.$^5$ ............................................... H01M 6/18
[52] U.S. Cl. .................................. 429/192; 429/197; 429/198; 429/194
[58] Field of Search ................ 429/192, 197, 198, 194

[56] References Cited

U.S. PATENT DOCUMENTS 4,840,856 6/1989 Nakacho et al. .................... 429/192

FOREIGN PATENT DOCUMENTS 61-91868 5/1986 Japan .
61-254626 11/1986 Japan .
62-274555 11/1987 Japan .

OTHER PUBLICATIONS

Blonsky et al, J. Am. Chem. Soc., 1984, 106 pp. 6854–6855.

Primary Examiner—Asok Pal
Attorney, Agent, or Firm—Armstrong, Westerman, Hattori, McLeland & Naughton

[57] ABSTRACT

The present invention provides a lithium secondary battery which comprises a layer of vanadium pentoxide serving as the positive electrode active substance, a substance capable of occluding and releasing lithium ions and serving as the negative electrode active substance, and a polymer represented by the following formula (I) and having a lithium salt dissolved therein to serve as the electrolyte, wherein said formula is

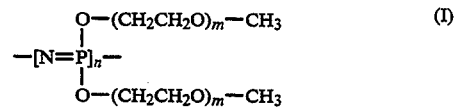

and wherein m is the average number of repeating ethyleneoxy units and is a real number of about 5 to about 25, and n is the average number of repetitions and is a real number in the range of $3 \leq n \leq 200000$.

The lithium secondary battery of the invention comprises two electrode active substances which have a high energy density and an electrolyte which is flame-retardant, nonflowable and safe, and is capable of retaining its characteristics even at low ambient temperatures of up to the ice point.

8 Claims, 3 Drawing Sheets

LITHIUM SECONDARY BATTERY OF VANADIUM PENTOXIDE AND POLYPHOSPHAZENE

This application is a continuation of application Ser. No. 07/598,641 filed Oct. 19, 1990, now abandoned.

TECHNICAL FIELD

The present invention relates to novel lithium secondary batteries, i.e., to all solid-state lithium secondary batteries free from any solvent and usable in the environmental temperature range for human living and activities.

BACKGROUND ART

Secondary batteries presently in wide use include lead batteries and nickel-cadmium batteries wherein the single-cell voltage is about 2 V, and an aqueous solution is used. In recent years, efforts have been made to investigate and develop secondary batteries of high energy density which give a high single-cell voltage of at least 3 V and include a negative electrode of lithium. However when lithium is used it reacts with water or the and aprotic electrolytes must be used since aqueous electrolytes not usable. Although polar organic solvents are presently wide use, a majority of these solvents have a low boiling point (high vapor pressure) are inflammable and therefore involve the likelihood of staining neighboring members and ignition or firing due to a leak or break and tile hazard of explosion due to erroneous use or overcharging. Furthermore, repeated discharge and charge of the secondary battery as contemplated form dendrites on the negative electrode, entailing the problem of reduced discharge-charge efficiency and short-circuiting between the positive and negative electrodes. Accordingly, many reports have been made on the development of techniques for improving the discharge-charge efficiency of the negative electrode and the cycle life by inhibiting dendrite formation. Proposed in these reports are, for example, use of a methylated cyclic ether solvent as the solvent for battery electrolytes (K. H. Abraham et al. in "Lithium Batteries", J. P. Gabano, editor, Academic Press, London (1983)), a method of forming an ionically conductive protective film at the Li interface by adding polyethylene glycol, polypropylene glycol, polyethylene oxide or like additive to an electrolyte system ( Journal of Power Sources, Vol 12, No. 2, pp. 83-144 (1984) and Unexamined Japanese Patent Publication S H 0 60-41773), a method of inhibiting Li dendrite formation by alloying an electrode per se with Al (Unexamined Japanese Patent Publication S H 0 59-108281).

On the other hand, M. Armand and N. Duelot disclose a novel secondary battery of high energy density incorporating a thin-film polymer electrolyte in Laid-Open French Patent Publication No. 2442512 and European Patent No. 13199. Yao et al. (J. I norg. Nucl. Chem., 1967, 29, 2453) and Farrington et al. (Science, 1979, 204, 1371) generally describe inorganic ionically conductive solids. These solids, which are powdery, must be pelletized by a high-pressure press for fabrication into batteries. This offers a great obstacle against productivity, uniformity, etc. The pelletized solid is hard and brittle, is therefore difficult to make into a thin film of increased area, and requires a great pressure when it is to be adhered to the active electrode substance, that the procedure has problems in work efficiency and adhesion. Furthermore, the solid encounters difficulty in following and compensating for variations in the volume of electrode materials during the operation of the battery and has the hazard of breaking the electrolyte. Sequlir et al. ( Extended Abstracts, 163rd Meeting Electrochemical Society, 1983, 83, 751, Abstract, No. 493) describe a battery of novel design including a solvent-free thin-film polymer electrolyte, stating that the electrolyte is usable at a medium temperature of about 100° C. as determined by testing. However, the conductivity at room temperature is as low as $10^{-6} \sim 10^{-7}$ S/cm and is insufficient.

P. M. Blonsky et al. ( J. Am. Chem. Soc., 106, 6854, 1984) state that di{2-(2-methoxyethoxy)ethoxy}polyphosphazene (M E E P ) is useful as an electrolyte or electrochemical batteries. However, they merely disclose data as to a.c. conductivity in the range of from 30° C. to 97° C. and have not effected discharge and charge with d.c.

As stated above, the problems encountered in developing high-performance secondary batteries are the formation of dendrites, leakage and hazards. The object of development is to complete high-performance secondary batteries which are free of these drawbacks, assured of safety, operable at usual ambient temperatures and at least 3 V in single-cell voltage.

An object of the present invention is to provide a lithium secondary battery comprising two electrode active substances which have a high, energy density, and an electrolyte which is flame-retardant, nonflowable and safe and has such high ion conductivity that it maintains its characteristics even at low ambient temperatures of not higher than the freezing point of water.

DISCLOSURE OF THE INVENTION

The present invention provides a lithium secondary battery which comprises a layer of vanadium pentoxide serving as the positive electrode active substance, a substance capable of occluding and releasing lithium ions and serving as the negative electrode active substance, and a polymer represented by the following formula (I) and having a lithium salt dissolved therein to serve as the electrolyte, wherein said formula is

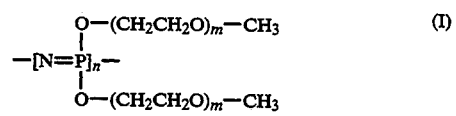

and herein m is the average number of repeating ethyleneoxy units and is a real number of about 5 to about 25, and n is the average number of repeating units and is a real number in the range of $3 \leq n \leq 200000$.

Whether batteries fabricated operate as desired as such can not be judged solely from the properties of the individual battery components, but the battery must be tested as a whole in order to make a judgement. For example the problems to be encountered are the interface impedance between the components current efficiency redox resistance, stability with time, etc. We have conducted research on positive electrode materials and negative electrode materials, which exhibit a high energy density hen used in combination with the above-mentioned solid electrolyte to provide a battery having a single-cell voltage of at least 3 V and which is operable at ambient temperatures. Consequently, we have found that the use of the electrolyte in combination with a positive electrode in the form of a layer of $V_2O_5$ and a negative electrode of a substance capable of occluding and releasing lithium ions provides a secondary battery which is operable as such to accomplish the present invention.

The layer of $V_2O_5$ for use in the present invention is prepared from amorphous $V_2O_5$ obtained by quenching molten $V_2O_5$, by dissolving the amorphous compound in water and drying the aqueous solution. For the purpose contemplated various methods are usable which include the spray-drying method for preparing fine particles and the spin-coating method for preparing a thin film. The desired film can be prepared easily by coating an electrically conductive substrate with the solution and drying the coating. FIG. 1 shows an X-ray diffraction pattern of the film. Amorphous $V_2O_5$ starts crystallization at room temperature in several months or at 150° C. in 5.5 hours ( Yamazaki et al., Nippon Kagaku Kaishi, No. 4, p.734, 1987), whereas $V_2O_2$ in the form of a layer retains the layer structure with good stability at a temperature of 200° C., so that the layer has the advantage of being usable stably at temperatures of up to the melting point of metallic lithium. Because the use of crystalline $V_2O_5$ as the positive electrode results in a small capacity and insufficient charge-discharge characteristics (see J. Electrochem. Soc. Meeting; Toronto, May 11~16, 1975, No. 27), batteries apparently deteriorate if amorphous $V_2O_5$ is used as the positive electrode.

On the other hand, the negative electrode active substance for use in the present invention is a substance capable of occluding and releasing lithium ions. Examples of such substances are metallic lithium, lithium alloys including Li.Al, Li.Hg, Li.Pb, Li.Sn and Wood's alloys, and composite materials of lithium and a carbon compound such as polyacetylene or graphite. These substances can be made into negative electrodes by forming the substance into a sheet, and cladding an electrically conductive net or the like of nickel, stainless steel or the like with the sheet, as generally practiced.

Further used as the electrolyte is a polymer represented by the formula (I) and having a lithium salt dissolved therein.

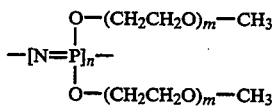

(I)

wherein m is the average number of repeating ethyleneoxy units and is about 5 to about 25 preferably about 7, and n is a real number in the range of $3 \leq n \leq 200000$. When m is about 7 the electrolyte gives ion conductivity of $10^{-3} \sim 10^{-4}$ S/cm at room temperature which is not available with M E E P, thus ensuring ion conduction at room temperature. The polymer can be prepared, for example, from dichlorophosphonitrile polymer obtained by the ring-opening polymerization of hexachlorotriphosphonitrile, by reacting a predetermined quantity of sodium alcoholate of an oligoethylene glycol monoalkylether prepared in advance with the polymer. The reaction can be conducted with use of a usual organic solvent, such as tetrahydrofuran or diglyme, by mixing the reactants together at a temperature of up to about 40° C. and subsequently refluxing the mixture with heating for several hours. For use as the electrolyte, the polymer is made into a film which is prepared by dissolving the polymer in a solvent such as tetrahydrofuran, dioxane, dimethoxyethane or like ether, acetone, methyl ethyl ketone or like ketone, methanol, ethanol or like alcohol, acetonitrile or propylene carbonate, uniformly dissolving a lithium salt in the solvent solution, and making the solution into the film.

The lithium salt suitable for use in the invention is at least one salt selected from among $LiClO_4$, $LiAlCl_4$, $LiBF_4$, $LiCl$, $LiPF_6$, $LiAsF_6$, $CF_3SO_3Li$ and the like. Further, when required for the battery structure, a porous separator film can be impregnated with the electrolyte for the use of the electrolyte.

FIG. 2 shows an example of an all solid-state secondary battery embodying the invention, which is exemplary of sheet-type batteries. However, the invention is not limited to the application to batteries of this type but can of course be embodied as batteries of the button type, tubular type, etc.

Batteries are prepared, for example, by coating a specified stainless steel plate with an aqueous solution of $V_2O_5$, drying the coating, thereafter applying a solution of polymer electrolyte prepared in advance, removing the solvent to form a film, placing a lithium-coated stainless steel plate separately prepared in an inert gas atmosphere over the electrolyte film, and vacuum-sealing the resulting assembly with use of a sealing material.

BRIEF DESCRIPTION OF THE DRAWINGS

FIG. 2 shows a layer of $V_2O_5$ 1, polyphosphazene electrolyte 2, metallic lithium 3, S U S plates 4 and 5, and sealing material 6.

BEST MODE OF CARRYING OUT THE INVENTION

The present invention will be described below in greater detail with reference to an example. The battery was prepared entirely in an argon atmosphere, and measurements, were obtained in the atmospheric air. The battery held in the same state as when batteries are actually used, for the determination of characteristics inclusive of the durability of the battery in its entirety.

EXAMPLE 1

Amorphous $V_2O_5$ obtained by the quenching method or the like was made into a 3% aqueous solution, which was then uniformly applied, in an amount of 4.44 g, to the central portion, 36 $cm^2$, of stainless steel foil measuring 5.5 cm $\times$ 9 cm and 20 $\mu$m in thickness. The coated foil was dried at about 80° to about 100° C. for 0.5 to 1 hour to form a film, which was thereafter dried at 180° C. for 5 hours for use as a positive electrode. The resulting member was coated with 2.43 of a solution which was prepared separately by dissolving 10 g of a polymer represented by [NP{O(CH$_2$CH$_2$O)$_7$ CH$_3$}$_2$]n and having an average molecular weight of about 1,000,000 and 1 g of LiClO$_4$ in 189 g of tetrahydrofuran (THF), and subjecting the solution to an ultrasonic treatment at 40° C. The THF was removed from the coating to form a film.

On the other hand, the central portion, 36 cm$^2$, of a stainless steel plate measuring 5.5 cm×9 cm and 20 μm in thickness was clad with lithium foil, about 40 μm in thickness, and a sealing material was applied to the peripheral portion of the plate to obtain a negative electrode member. The two members were affixed to each other, and the assembly was vacuum-sealed to complete a battery.

Figure 3:
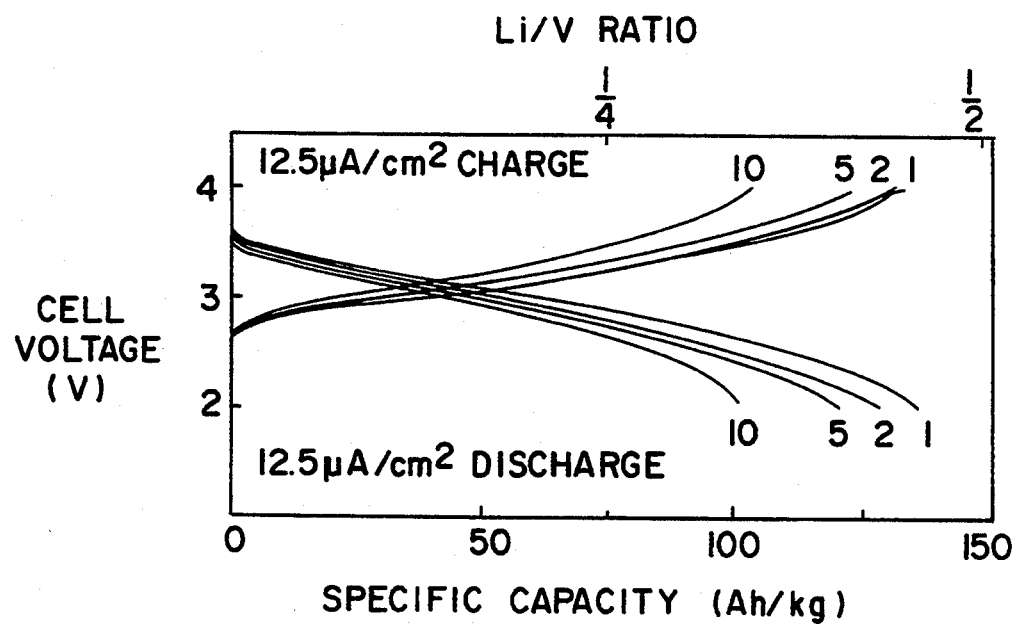
FIGS. 3 is a graph showing the constant-current charge-discharge, characteristics of the battery prepared in Example 1.
Figure 4:
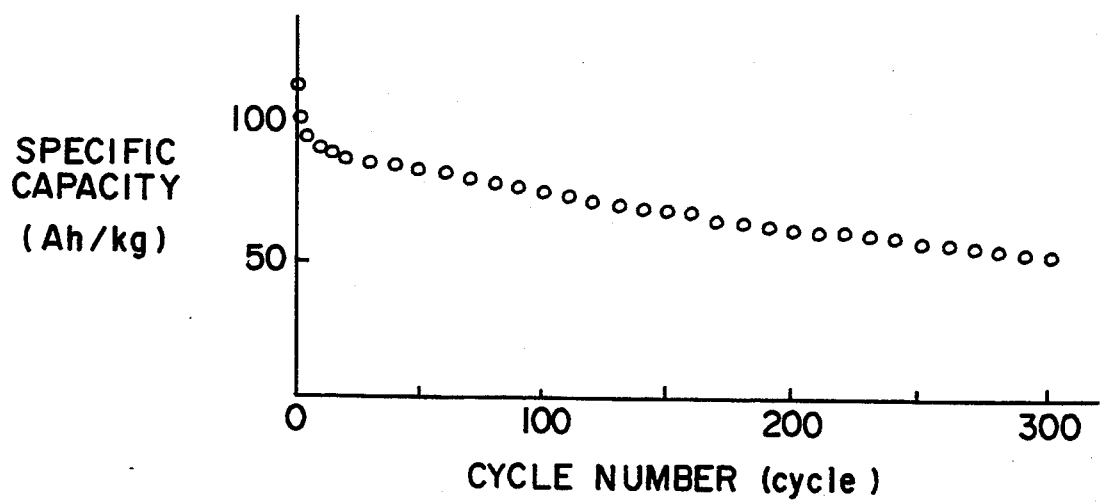
FIG. 4 is a graph showing variations in the discharge capacity with charge-discharge cycles of the battery prepared in Example 1.
Figure 5:
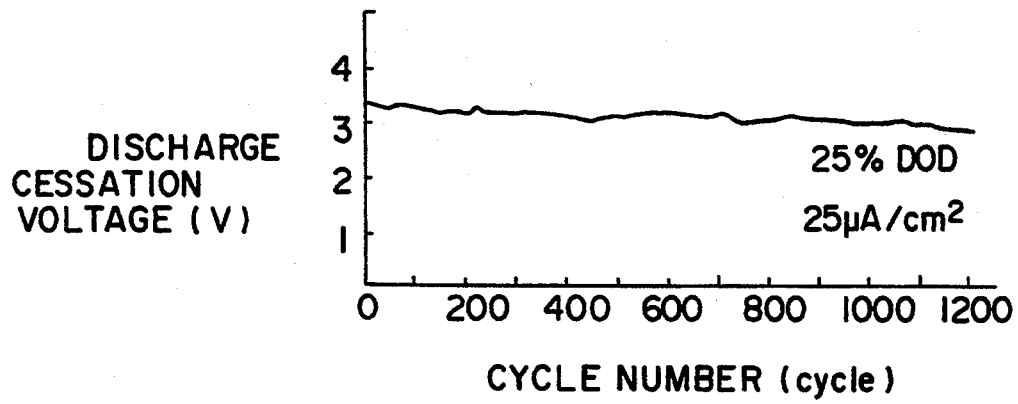
FIG. 5 is a graph showing variations in the discharge cessation voltage with charge-discharge cycles of the battery prepared in Example 1.
Figure 6:
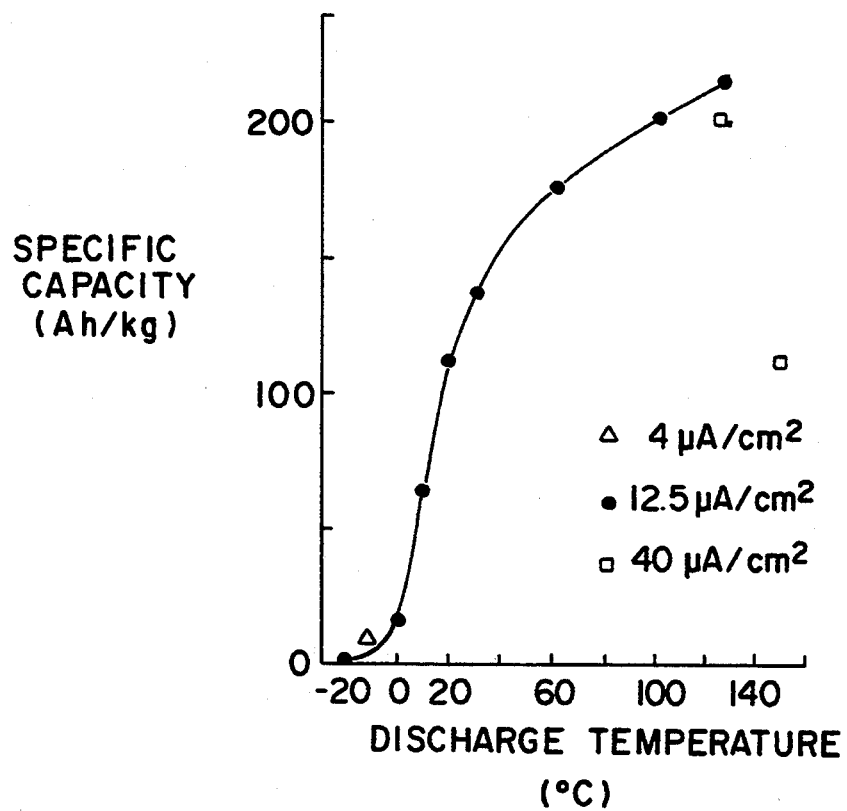
FIG. 6 is a graph showing temperature characteristics of the battery prepared in Example 1.

The battery thus fabricated was 3.84 V in open-circuit voltage. FIG. 3 shows the result achieved by the battery when it was charged and discharged at a constant current of 450 μA at 30° C. Until the voltage dropped to 2 V, the battery had an initial discharge capacity density of about 130 Ah/kg and an energy density of about 360 Wh/kg relative to the positive electrode active substance. With one half of the initial discharge capacity taken as a standard, the charge-discharge cycle life as about 300 cycles (FIG. 4). When the battery as subjected to a charge-discharge cycle test at a current density of 900 μA/cm$^2$ and discharge depth of 25%, the discharge cessation voltage in the 1000th cycle was 3 V (FIG. 5), hence satisfactory cycle characteristics. We further found that the battery operated normally as a secondary battery in the temperature range of from −10° C. to 120° C. (FIG. 6).

Industrial Application

The lithium secondary battery of the invention comprises two electrode active substances which have a high energy density, and an electrolyte which is flame-retardant nonflowable and safe, and is capable of retaining its characteristics even at low ambient temperatures of up to the freezing point of water and usable in the environmental temperature range for human living and activities.

Figure 1:
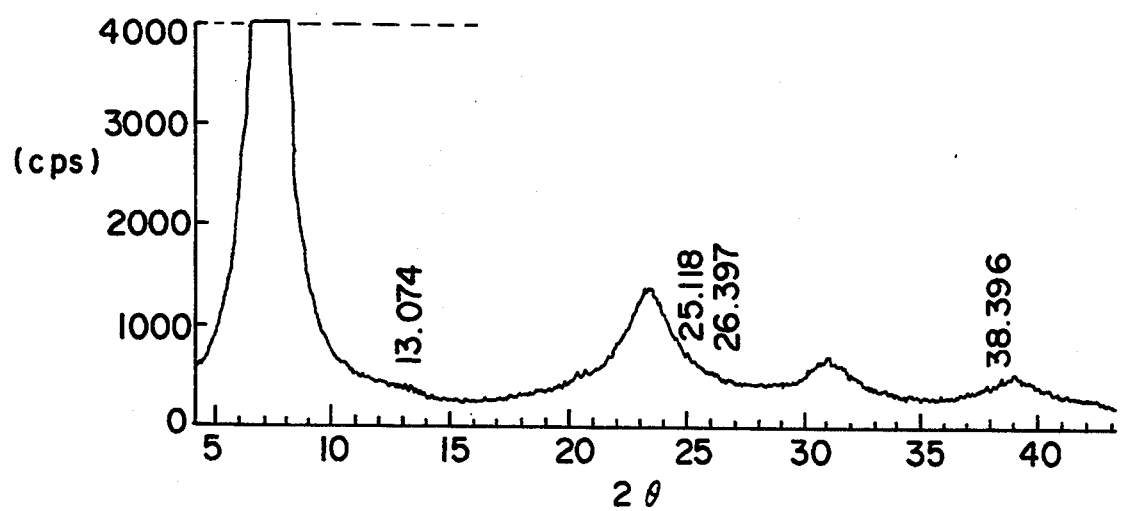
FIG.1 is an X-ray diffraction pattern of a layer of $V_2O_5$.
Figure 2:
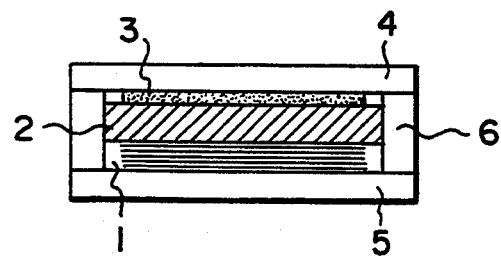
FIG. 2 is a sectional view schematically showing a sheet-type battery as an embodiment of the invention.

We claim:

1. A lithium secondary battery which comprises a layer of vanadium pentoxide having an X-ray diffraction pattern as shown in FIG. 1 serving as the positive electrode active substance, a substance capable of occluding and releasing lithium ions serving as the negative electrode active substance, and a polymer represented by the following formula (I) and having a lithium salt dissolved therein serving as the electrolyte, wherein said formula is

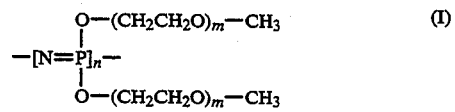

and wherein m is the average number of repeating ethyleneoxy units and is a real number of about 5 to about 25, and n is the average number of repetitions and is a real number in the range of $3 \leq n \leq 200000$.

2. A lithium secondary battery as defined in claim 1 wherein m is about 7 which is the average number of repeating ethyleneoxy units in the polymer represented by the formula (I).

3. A lithium secondary battery as defined in claim 1 or claim 2 wherein the negative electrode active substance is metallic lithium, and the lithium salt lithium perchlorate or lithium trifluoromethylsulfonate.

4. A lithium secondary battery, comprising:
 a layer of vanadium pentoxide having an X-ray diffraction pattern as shown in FIG. 1 serving as the positive electrode active substance, said vanadium pentoxide layer being obtained by applying a solution of amorphous pentoxide obtained by a quenching method to a substrate, drying the applied solution at about 80° to 100° C. to form a film, and then drying the film at about 180° C. to form the vanadium pentoxide layer;
 a substance capable of occluding and releasing lithium ions serving as the negative electrode active substance; and
 a polymer represented by the following formula (I) and having a lithium salt dissolved therein serving as the electrolyte, wherein said formula is

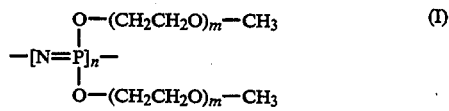

wherein m is the average number of repeating ethyleneoxy units and is a real number of about 5 to 25, and n is the average number of repetitions and is a real number in the range of $3 \leq n \leq 200000$.

5. A lithium secondary battery as defined in claim 4, wherein m is about 7 which is the average number of repeating ethyleneoxy units in the polymer represented by the formula (I).

6. A lithium secondary battery as defined in claim 4 wherein the negative electrode active substance is metallic lithium, and the lithium salt is lithium perchlorate or lithium trifluoromethylsulfonate.

7. A lithium secondary battery as defined in claim 4, wherein said drying of the film at 180° C. is conducted for about 5 hours.

8. A lithium secondary battery as defined in claim 4, wherein said solution is applied by one of a spray-drying method and a spin-coating method.

* * * * *